(12) United States Patent
Fang

(10) Patent No.: US 11,390,344 B2
(45) Date of Patent: Jul. 19, 2022

(54) WATERPROOF OUTDOOR STORAGE BAG

(71) Applicant: Songke Fang, Guangdong (CN)

(72) Inventor: Songke Fang, Guangdong (CN)

( * ) Notice: Subject to any disclaimer, the term of this patent is extended or adjusted under 35 U.S.C. 154(b) by 0 days.

(21) Appl. No.: 17/166,019

(22) Filed: Feb. 3, 2021

(65) Prior Publication Data

US 2022/0142336 A1    May 12, 2022

(30) Foreign Application Priority Data

Nov. 11, 2020  (CN) .......................... 202011253819.0

(51) Int. Cl.
| | | |
|---|---|---|
| *B62J 9/20* | (2020.01) | |
| *B62J 9/21* | (2020.01) | |
| *A45C 13/00* | (2006.01) | |
| *H04B 1/3888* | (2015.01) | |
| *B62J 50/21* | (2020.01) | |
| *A45C 13/10* | (2006.01) | |
| *A45C 11/00* | (2006.01) | |

(52) U.S. Cl.
CPC ............... *B62J 9/20* (2020.02); *A45C 13/008* (2013.01); *B62J 9/21* (2020.02); *B62J 50/225* (2020.02); *H04B 1/3888* (2013.01); *A45C 13/1023* (2013.01); *A45C 2011/002* (2013.01); *A45C 2200/10* (2013.01)

(58) Field of Classification Search
CPC ............... B62J 9/20; B62J 9/21; B62J 50/225
USPC ...................................................... 224/420
See application file for complete search history.

(56) References Cited

U.S. PATENT DOCUMENTS

| | | | | | |
|---|---|---|---|---|---|
| D453,716 | S | * | 2/2002 | Iteya ...................... | B62J 50/225 D12/114 |
| 7,609,512 | B2 | * | 10/2009 | Richardson ............... | G06F 1/26 361/679.02 |
| 2011/0101059 | A1 | * | 5/2011 | Haralson .................... | B62J 9/22 224/463 |
| 2013/0214019 | A1 | * | 8/2013 | Wu ........................ | B62J 50/225 224/412 |

FOREIGN PATENT DOCUMENTS

| | | | | |
|---|---|---|---|---|
| DE | 202016003868 U1 | * | 11/2016 | |
| KR | 2017002640 U | * | 7/2017 | ............. A44B 18/00 |

* cited by examiner

*Primary Examiner* — Scott T McNurlen
(74) *Attorney, Agent, or Firm* — Cooper Legal Group, LLC

(57) ABSTRACT

A waterproof outdoor storage bag comprises a bag body and a bag cover covering the upper end of the bag body. A zipper is arranged between the upper edge of the bag body and the lower edge of the bag cover, and the bag body and the bag cover are opened and closed by the zipper. A positioning strap is arranged at the bottom of the bag body. The bag cover is provided with a mobile phone screen window. A mobile phone stop frame is arranged on the edge of the mobile phone screen window. An elastic fixing strap for a mobile phone is respectively fused to two sides, which correspond to the mobile phone screen window, at the lower end of the bag cover, and a hook and a loop adhered to each other are arranged at the ends of the two elastic fixing straps for the mobile phone.

10 Claims, 4 Drawing Sheets

WATERPROOF OUTDOOR STORAGE BAG

RELATED APPLICATION

This application claims priority to Chinese Patent Application 202011253819.0, filed on Nov. 11, 2020, which is incorporated herein by reference.

TECHNICAL FIELD

The present disclosure relates to the field of outdoor storage bags, in particular to a waterproof outdoor storage bag.

BACKGROUND

In order to bring convenience for a user who travels by a bicycle or other vehicle with similar structures to carry articles, installing storage bags on the bicycles has become the conventional means used by the general public. However, with the continuous improvement of mobile phones with respect to performances in recent years, especially application (APP) software involving navigation, sports, and timing in mobile phones, the dependency of people on mobile phones for driving, sports, travel navigation, and other operations increases continuously. Therefore, a transparent window for fixing a mobile phone is arranged on a storage bag, such that people can directly view the mobile phone through the transparent window in the process of bicycling, which brings many conveniences to users in bicycling. However, since the transparent window is arranged at the upper end of the storage bag, when the mobile phone is fixed in the transparent window, the storage bag cannot protect the mobile phone. The mobile phone is easily damaged if the storage bag undergoes bumps and other situations.

SUMMARY

In order to overcome the defects in the above situations, the present disclosure aims to provide a technical solution that can solve the above problems.

A waterproof outdoor storage bag comprises a bag body and a bag cover covering an upper end of the bag body, wherein a zipper is arranged between an upper edge of the bag body and a lower edge of the bag cover, and the bag body and the bag cover are opened and closed by the zipper. A positioning strap is arranged at a bottom of the bag body. The bag cover is provided with a mobile phone screen window. A mobile phone stop frame is arranged on an edge of the mobile phone screen window. An elastic fixing strap for a mobile phone is respectively fused to two sides, which correspond to the mobile phone screen window, at a lower end of the bag cover, and a hook and a loop which are adhered to each other are arranged at ends of the two elastic fixing straps for the mobile phone. An enclosed transparent soft film is fused to an inside of the mobile phone stop frame. A protective frame is disposed upward on an edge of the mobile phone stop frame. An upper end of the protective frame is configured to gradually incline downward from front to back, drainage groove channels are arranged at a rear end of the protective frame, and diversion groove channels that extend to both sides of the protective frame are arranged on an upper edge of a front side of the protective frame.

Preferably, a reversible soft edge is connected between the bag body and a rear end of the bag cover, two ends of the zipper are butted onto both sides of the reversible soft edge, a silicone portion is arranged in a middle of the reversible soft edge, and a thread passing opening is cut on the silicone portion.

Preferably, a water-barrier strip is respectively arranged on the upper edge of the bag body and the lower edge of the bag cover, and the water-barrier strips are attached to an outside of the zipper and are in sliding fit with a head of the zipper.

Preferably, the positioning strap comprises a main strap and an auxiliary strap, wherein the main strap is arranged at a center-line position at the bottom of the bag body, and the auxiliary strap is arranged at a front end of the bag body.

Preferably, there are two auxiliary strips, which are respectively arranged at the bottom of the bag body and are symmetrical to each other along the center-line position at the bottom of the bag body.

Preferably, there is one auxiliary strap, which is arranged in a middle of a front side of the bag body.

Preferably, a positioning groove channel is formed at the center-line position of the lower end of the bag body.

Preferably, there are two sets of drainage groove channels, which are located at a left end and a right end of the rear end of the protective frame respectively and are configured to incline outward.

Preferably, there are two sets of drainage groove channels. An inner wall of the protective frame at the rear end is an inclined surface, and a barrier strip is formed upward between positions, corresponding to the two sets of drainage groove channels, at the rear end of the protective frame.

Preferably, an inclined portion that extends to the bag cover is formed at the front side of the protective frame, a water-barrier groove is formed in a middle of the inclined portion, and diversion grooves that are abutted to the diversion groove channels are respectively arranged at positions, corresponding to both sides of the water-barrier groove, of the protective frame.

Compared with the prior art, the present disclosure has the following technical effects: the mobile phone screen window is arranged on the bag cover, the mobile phone stop frame is arranged on the edge of the mobile phone screen window, the enclosed transparent soft film is fused to cover the mobile phone stop frame, and the mobile phone is then fixed by using the two elastic fixing straps for the mobile phone that are attached via the hook and the loop, such that the mobile phone screen is correspondingly placed at the mobile phone window, thereby facilitating operating and watching the mobile phone in bicycling.

The protective frame is formed on the mobile phone stop frame to protect the periphery of the mobile phone. The protective frame is configured to gradually incline downward from front to back, so that the front side of the protective frame can be used for shading light, thereby playing a light-shading role.

The drainage groove channels are arranged at the rear end of the protective frame, such that accumulated water formed inside the protective frame in rainy days can be drained through the drainage groove channels in bicycling, so as to prevent the problem of water accumulation inside the protective frame.

The diversion groove channels that extend to both sides of the protective frame are arranged on the upper edge of the front side of the protective frame, such that rainwater will be guided along the drainage groove channels to both sides of the bag cover, thereby preventing rainwater from entering the inside of the protective frame.

The additional aspects and advantages of the present disclosure will be partially given in the following description, and some of them will become obvious from the following description, or be learned through the practice of the present disclosure.

BRIEF DESCRIPTION OF THE DRAWINGS

To describe the embodiments of the present disclosure or the technical solutions in the prior art more clearly, the following briefly introduces the accompanying drawings required for describing the embodiments or the descriptions in the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
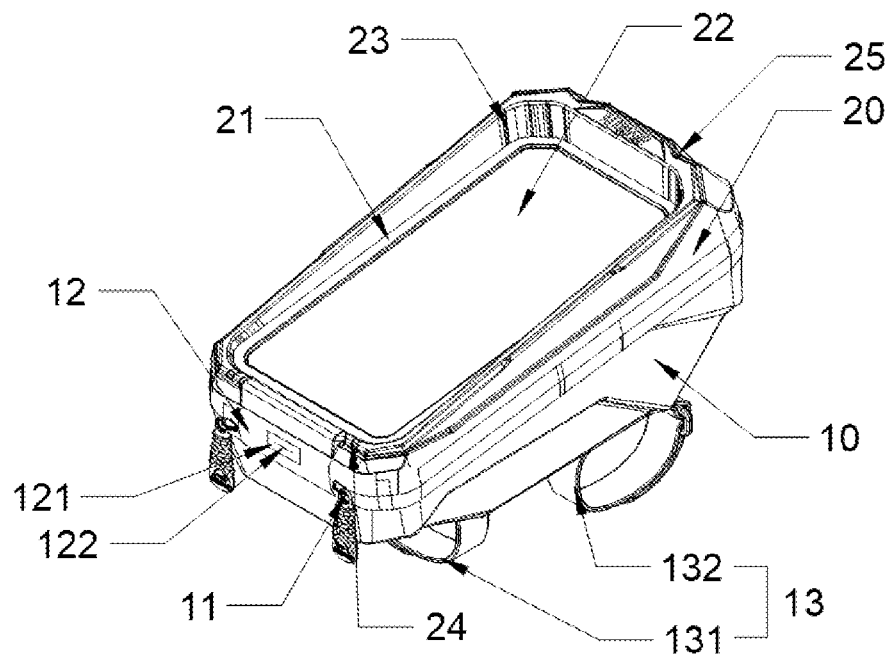
FIG. 1 is a schematic structural diagram of the present disclosure.

The technical solutions in the embodiments of the present disclosure will be described clearly and completely below. Of course, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Referring to FIGS. 1-5, in an embodiment of the present disclosure, a waterproof outdoor storage bag comprises a bag body 10 and a bag cover 20 covering the upper end of the bag body 10. A zipper 11 is arranged between the upper edge of the bag body 10 and the lower edge of the bag cover 20, and the bag body 10 and the bag cover 20 are opened and closed by the zipper 11. A positioning strap 13 is arranged at the bottom of the bag body 10. The bag cover 20 is provided with a mobile phone screen window 201. A mobile phone stop frame 21 is arranged on the edge of the mobile phone screen window 201. An elastic fixing strap 26 for a mobile phone is respectively fused to two sides, which correspond to the mobile phone screen window 201, at the lower end of the bag cover 20, and the hook and loop 261 (e.g., a hook-and-loop fastener) which are adhered to each other are arranged at the ends of the two elastic fixing straps 26 for the mobile phone. An enclosed transparent soft film 22 is fused to the inside of the mobile phone stop frame 21. A protective frame 23 is formed upward on the edge of the mobile phone stop frame 21. The upper end of the protective frame 23 is configured to gradually incline downward from front to back, drainage groove channels 24 are arranged at the rear end of the protective frame 23, and diversion groove channels 25 that extend to both sides of the protective frame 23 are arranged on the upper edge of the front side of the protective frame 23.

In the above technical means, the mobile phone screen window 201 is arranged on the bag cover 20, the mobile phone stop frame 21 is arranged on the edge of the mobile phone screen window 201, the enclosed transparent soft film 22 is fused to cover the mobile phone stop frame 21, and a mobile phone is then fixed by using the two elastic fixing straps 26 for the mobile phone that are attached via the hook and loop 261, such that the mobile phone screen is correspondingly placed at the mobile phone screen window 201, thereby facilitating operating and watching the mobile phone in bicycling, The protective frame 23 is formed on the mobile phone stop frame 21 to protect the periphery of the mobile phone, and the protective frame 23 is configured to gradually incline downward from front to back, so that the front side of the protective frame 23 can be used for shading light, thereby playing a light-shading role. The bag cover 20, the mobile phone stop frame 21, and the protective frame 23 are of an integral structure, which is injection molded by a mold, wherein the transparent soft film 22 is fused to the molded bag cover 20 by means of high-frequency discharge or heating, and the bag cover 20 and the transparent soft film 22 are made of two materials that are fusible mutually, so that the transparent soft film 22 and the mobile phone stop frame 21 are sealed and water-tight.

The drainage groove channels 24 are arranged at the rear end of the protective frame 23, such that accumulated water formed inside the protective frame 23 in rainy days can be drained through the drainage groove channels 24 in bicycling, so as to prevent the problem of water accumulation inside the protective frame 23.

The diversion groove channels 25 that extend to both sides of the protective frame 23 are arranged on the upper edge of the front side of the protective frame 23, such that rainwater will be guided along the diversion groove channels 25 to both sides of the bag cover 20, thereby preventing rainwater from entering the inside of the protective frame 23.

Figure 2:
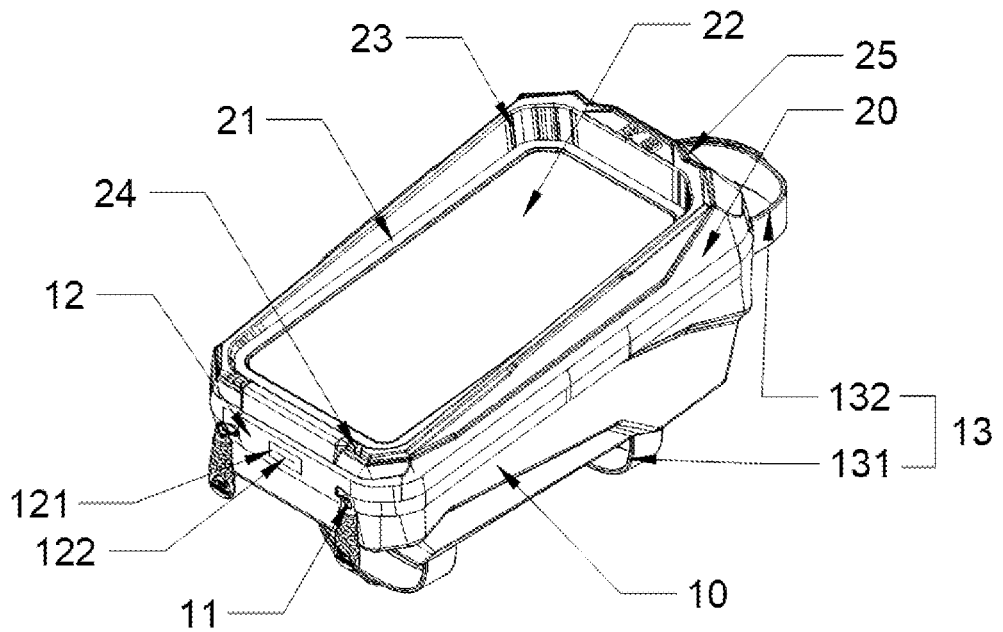
FIG. 2 is another schematic structural diagram of the present disclosure.
Figure 3:
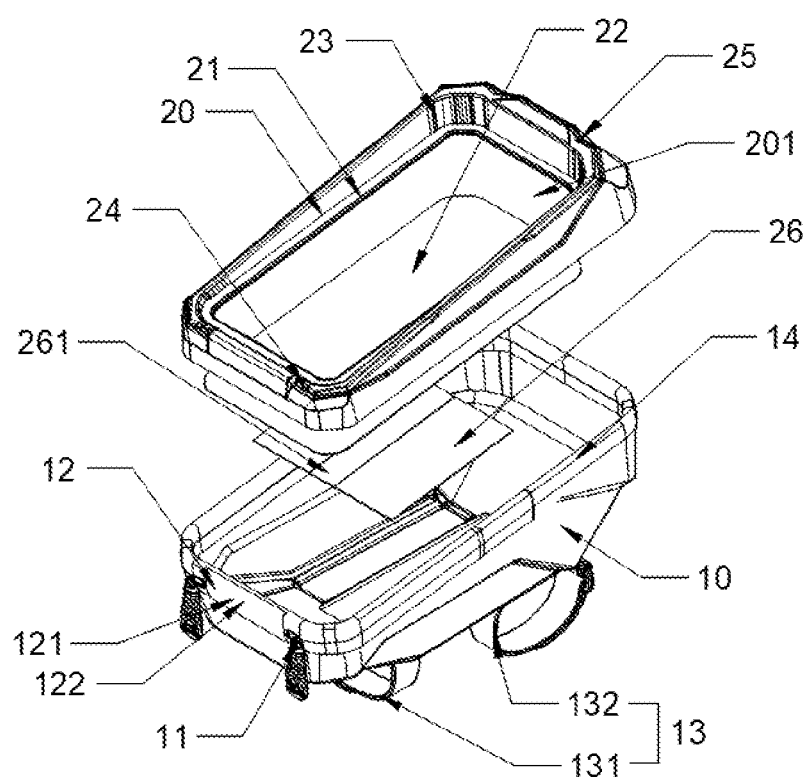
FIG. 3 is a schematically exploded view of the present disclosure.

Further, as shown in FIGS. 1-2, a reversible soft edge is connected between the bag body 10 and the rear end of the bag cover 20, two ends of the zipper 11 are butted onto both sides of the soft edge, a silicone portion is arranged in the middle of the soft edge, and a thread passing opening is cut on the silicone portion. By providing the soft edge, the bag body 10 and the bag cover 20 can be reversibly connected. In addition, the silicone portion is arranged on the soft edge and the thread passing opening is cut on the silicon portion, such that an earphone can pass through the thread passing opening, and the structural design of the silicone portion can play a waterproof role in the thread passing opening.

Further, as shown in FIGS. 1-4, a water-barrier strip 14 is respectively arranged on the upper edge of the bag body 10 and the lower edge of the bag cover 20, and the water-barrier strips 14 are attached to the outside of the zipper 11 and are in sliding fit with a head of the zipper 11. The water-barrier strips 14 can play a water-barrier role in the zipper 11, thereby achieving a waterproof effect.

Further, as shown in FIGS. 1-4, the positioning strap 13 comprises a main strap 131 and an auxiliary strap 132, wherein the main strap 131 is arranged at the center-line position at the bottom of the bag body 10, and the auxiliary strap 132 is arranged at the front end of the bag body 10.

Further, as shown in FIG. 1, there are two auxiliary straps 132, which are respectively arranged at the bottom of the bag body 10 and are symmetrical to each other along the center-line of the bottom of the bag body 10.

Further, as shown in FIG. 2, there is one auxiliary strap 132, which is arranged in the middle of the front side of the bag body 10.

Figure 4:
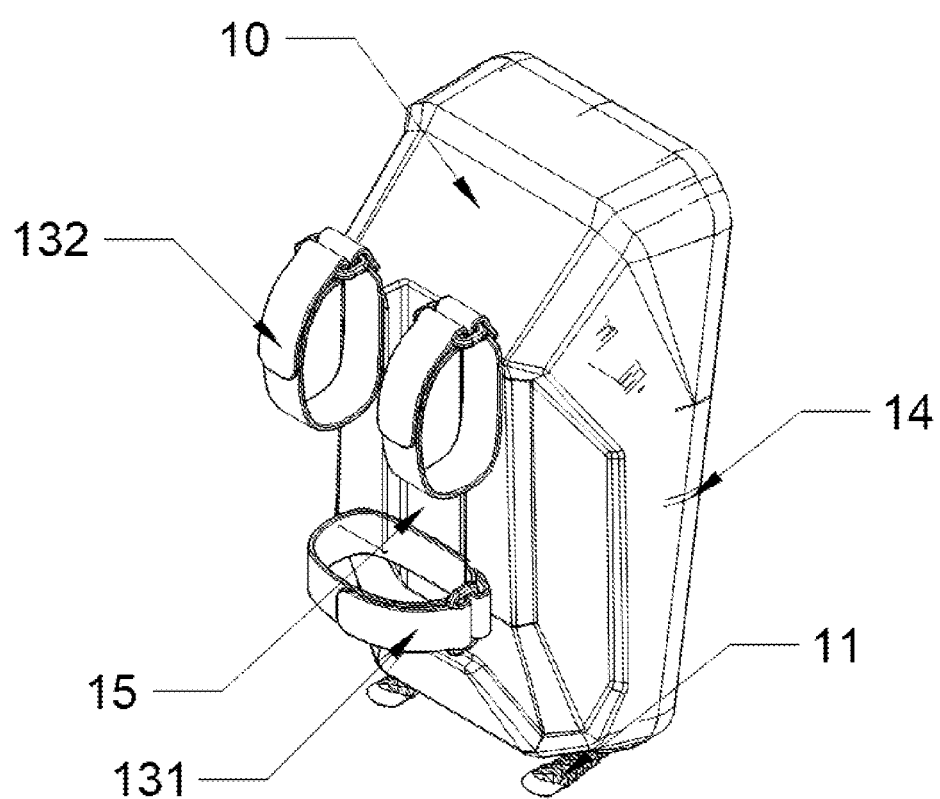
FIG. 4 is a schematic structural diagram of a bag body in the present disclosure.

Further, as shown in FIG. 4, a positioning groove channel 15 is formed at the center-line position of the lower end of the bag body 10.

In the above technical means, by providing the main strap 131 that is bound to a frame of a bicycle and the auxiliary strap 132 that is bound to the head of the bicycle, in the case of two auxiliary straps 132 arranged at the bottom of the bag body 10, the two auxiliary straps are bound to handlebars of the head of the bicycle; and in the case of one auxiliary strap 132 arranged in front of the bag body 10, the auxiliary strap 132 is bound to a connecting on the head of the bicycle. In addition, the positioning groove channel 15 is provided to be clamped to the frame of the bicycle to take a stabilizing effect.

Figure 5:
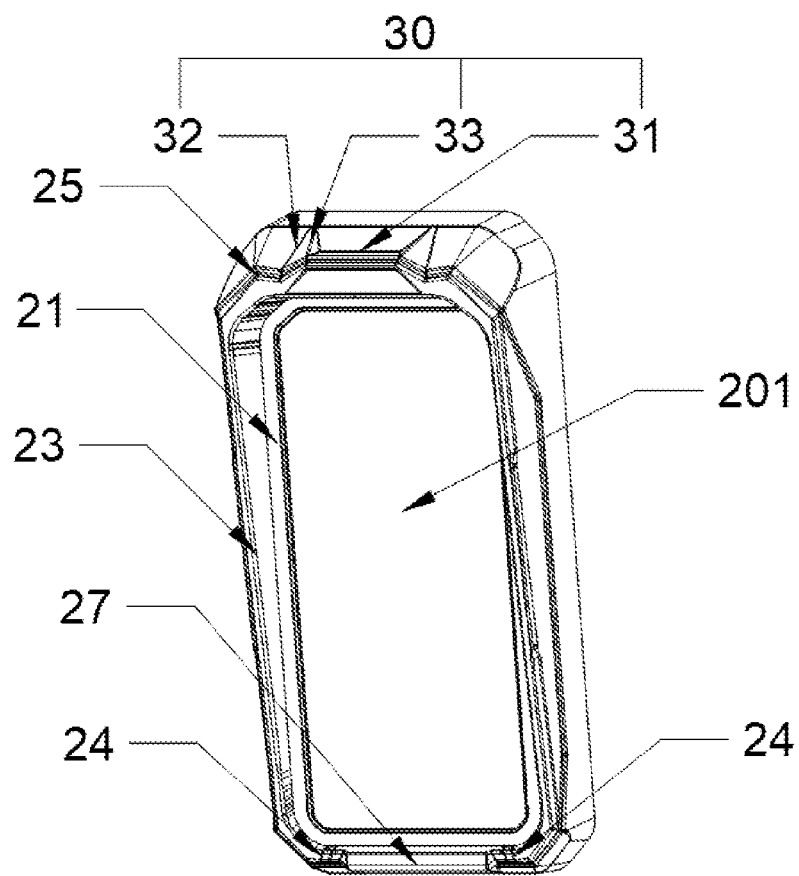
FIG. 5 is a schematic structural diagram of a bag cover in the present disclosure.

Further, as shown in FIG. 5, there are two sets of drainage groove channels 24, which are located at the left and right ends of the rear end of the protective frame 23 respectively and are configured to incline outward. By means of such structural design, the water discharged from the drainage groove channels 24 can be discharged toward both sides, thereby preventing the discharged water from splashing to a driver.

Further, as shown in FIG. 5, the inner wall of the protective frame 23 at the rear end is an inclined surface, and a barrier strip 27 is formed upward between positions, corresponding to the two sets of drainage groove channels 24, at the rear end of the protective frame 23. With the cooperation of the inclined surface and the barrier strip 27, when water in the protective frame 23 accumulates too much, and thus cannot be discharged completely by the drainage groove channels 24, the barrier strip 27 will guide the water to be discharged toward both sides, so as to prevent the discharged water from being splashed to the driver when the water accumulates too much.

Further, as shown in FIG. 5, an inclined portion 30 that extends to the bag cover 20 is formed in front of the protective frame 23, a water-barrier groove 31 is formed in the middle of the inclined portion 30, diversion grooves 32 that are abutted to the diversion groove channels 25 are respectively arranged at positions, corresponding to both sides of the water-barrier groove 31, of the protective frame 23, and a guide surface 33 is provided between the water-barrier groove 31 and the diversion grooves 32. By providing the inclined portion 30 and providing the water-barrier groove 31 on the inclined portion 30, the water-barrier groove 31 and the diversion grooves 32 transfer rainwater through the guide surface 33, so that the rainwater is guided to both sides as much as possible, thereby further preventing the rainwater from entering the inside of the protective frame 23.

It is obvious for those skilled in the art that the present disclosure is not limited to the details of the above exemplary embodiments, and the present disclosure can be embodied in other specific forms without departing from the spirit or essential characteristics of the present disclosure. Therefore, the embodiments shall be considered as illustrative and not restrictive from any point. The scope of the disclosure is defined by the appended claims rather than the above illustration. Hence, all changes falling in the meaning and scope of equivalent elements of the claims are included in the present disclosure.

The invention claimed is:

1. A waterproof outdoor storage bag, comprising a bag body and a bag cover covering an upper end of the bag body, wherein a zipper is arranged between an upper edge of the bag body and a lower edge of the bag cover, the bag body and the bag cover are opened and closed by the zipper, and a positioning strap is arranged at a bottom of the bag body; the bag cover is provided with a mobile phone screen window; a mobile phone stop frame is arranged on an edge of the mobile phone screen window; an elastic fixing strap for a mobile phone is respectively fused to two sides of the bap cover, which correspond to the mobile phone screen window, at a lower end of the bag cover, and a hook and a loop which are adhered to each other are arranged at ends of the two elastic fixing straps for the mobile phone; an enclosed transparent soft film is fused to an inside of the mobile phone stop frame; a protective frame is disposed upward on an edge of the mobile phone stop frame; and an upper end of the protective frame is configured to gradually incline downward from front to back, drainage groove channels are arranged at a rear end of the protective frame, and diversion groove channels that extend to both sides of the protective frame are arranged on an upper edge of a front side of the protective frame.

2. The waterproof outdoor storage bag according to claim 1, wherein a reversible soft edge is connected between the bag body and a rear end of the bag cover, two ends of the zipper are butted onto both sides of the reversible soft edge, a silicone portion is arranged in a middle of the reversible soft edge, and a thread passing opening is cut on the silicone portion.

3. The waterproof outdoor storage bag according to claim 1, wherein a water-barrier strip is respectively arranged on the upper edge of the bag body and the lower edge of the bag cover, and the water-barrier strips are attached to an outside of the zipper and are in sliding fit with a head of the zipper.

4. The waterproof outdoor storage bag according to claim 1, wherein the positioning strap comprises a main strap and an auxiliary strap, wherein the main strap is arranged at a center-line position at the bottom of the bag body, and the auxiliary strap is arranged at a front end of the bag body.

5. The waterproof outdoor storage bag according to claim 4, wherein there are two auxiliary straps, which are respectively arranged at the bottom of the bag body and are symmetrical to each other along the center-line position at the bottom of the bag body.

6. The waterproof outdoor storage bag according to claim 4, wherein there is one auxiliary strap, which is arranged in a middle of a front side of the bag body.

7. The waterproof outdoor storage bag according to claim 4, wherein a positioning groove channel is formed at the center-line position of the lower end of the bag body.

8. The waterproof outdoor storage bag according to claim 1, wherein there are two sets of drainage groove channels, which are located at a left end and a right end of the rear end of the protective frame respectively and are configured to incline outward.

9. The waterproof outdoor storage bag according to claim 1, wherein there are two sets of drainage groove channels; and an inner wall of the protective frame at the rear end is an inclined surface, and a barrier strip is formed upward between positions, corresponding to the two sets of drainage groove channels, at the rear end of the protective frame.

10. The waterproof outdoor storage bag according to claim 1, wherein an inclined portion that extends on the bag cover is formed at the front side of the protective frame, a water-barrier groove is formed in a middle of the inclined portion, and diversion grooves that are abutted to the diversion groove channels are respectively arranged at positions corresponding to both sides of the water-barrier groove of the protective frame.

\* \* \* \* \*